United States Patent [19]

Merritt

[11] Patent Number: 4,941,924
[45] Date of Patent: Jul. 17, 1990

[54] CHEMICAL SOIL STABILIZATION

[75] Inventor: Ervin Merritt, Mineral Wells, Tex.

[73] Assignee: Chemical Soil Stabilization Technology, Inc., Aledo, Tex.

[21] Appl. No.: 236,346

[22] Filed: Aug. 22, 1988

Related U.S. Application Data

[63] Continuation of Ser. No. 160,024, Feb. 25, 1988, abandoned.

[51] Int. Cl.$^5$ .............................................. E01C 7/36
[52] U.S. Cl. ..................................... 106/900; 404/76; 47/DIG. 10
[58] Field of Search .......................... 106/900; 404/76; 47/DIG. 10

[56] References Cited

U.S. PATENT DOCUMENTS

| | | | |
|---|---|---|---|
| 2,212,574 | 8/1940 | Roth | 106/31 |
| 2,899,329 | 8/1959 | Lyons | 106/287 |
| 2,899,330 | 8/1959 | Lyons | 106/287 |
| 3,075,851 | 1/1963 | Hemwall | 106/287 |
| 3,077,740 | 2/1963 | Hemwall | 61/36 |
| 3,738,425 | 6/1973 | Thompson | 166/305 R |

*Primary Examiner*—Paul Lieberman
*Assistant Examiner*—Christine A. Skane
*Attorney, Agent, or Firm*—Geoffrey A. Mantooth; James C. Fails

[57] ABSTRACT

There is disclosed a method for chemically stabilizing cohesive soils. Sulfuric acid, citrus stripper oil, and water are admixed to the soil. Then the soil is packed to consolidate the soil particles.

13 Claims, No Drawings

CHEMICAL SOIL STABILIZATION

This is a continuation of co-pending application Ser. No. 160,024, filed Feb. 25, 1988, now abandoned.

FIELD OF THE INVENTION

The present invention relates to methods for chemically stabilizing cohesive soils for use in various construction projects.

BACKGROUND OF THE INVENTION

Compared to paved roads, unpaved or "dirt" roads are relatively inexpensive to build and maintain. Because of their low cost, unpaved roads are particularly suitable for rural roads that have low levels of traffic. Unpaved roads built and maintained utilizing the prior art suffer from numerous disadvantages; all of which add to the cost and shorten the life of the roads. Unpaved roads are prone to loss of fines (fine particles of soil), rutting, and drainage problems all of which result in the degradation of the road driving surface. Unpaved roads must be frequently maintained to provide a satisfactory driving surface.

One way of extending the life of unpaved roads involves chemical treatment of the soil making up the road. In the prior art, there are various methods of chemical treatment of soil, including the use of magnesium chloride, calcium chloride, silicone concrete sealer, and phosphoric acid, but all have proven to be unsatisfactory. Chemical treatments utilizing either magnesium chloride, calcium chloride, or silicone concrete sealer do not adequately stabilize the soil. Chemical treatments using phosphoric acid are rarely used because phosphoric acid is too dangerous and too expensive.

The object of the present invention is to provide an improved method of chemically stabilizing soils, which method is not subject to the disadvantages of the prior art.

DESCRIPTION OF PREFERRED EMBODIMENT

The present invention is a method for stabilizing cohesive soils. Generally, the first step is to admix concentrated sulfuric acid, citrus stripper oil, and water in a predetermined proportion to the soil which is to be treated. Then, the treated soil is compressed and packed to consolidate the soil.

In the preferred embodiment, the sulfuric acid and citrus stripper oil are mixed together in the following proportion:

| | |
|---|---|
| sulfuric acid | 85% |
| citrus stripper oil | 8% |
| surfactant | 6% |
| corrosion inhibitor | 1% |
| | 100% (by volume) |

This mixture will hereinafter be referred to as the preferred mixture. The surfactant helps to mix the sulfuric acid and citrus stripper oil with the soil. The corrosion inhibitor protects the mixing tank and mixing equipment if the sulfuric acid and citrus stripper oil are premixed before dilution with water. The method of the present invention can be practiced without the surfactant and the corrosion inhibitor.

In the preferred embodiment, the preferred mixture is premixed before dilution with water and addition to soil. Premixing the sulfuric acid, citrus stripper oil, and surfactant is convenient and maintains quality control. The mixing of the sulfuric acid, citrus stripper oil, and surfactant occurs slowly and cautiously to maintain stable temperatures. The citrus stripper oil and surfactant are slowly injected into the sulfuric acid, which is mixed at 10 rpm. As an alternative to premixing, the sulfuric acid, citrus stripper oil, and surfactant can be simultaneously mixed together with water in a tank.

The sulfuric acid used is concentrated, being of the 1835 BE grade. The citrus stripper oil used is that which is so-called by the citrus industry of Florida. It is also referred to as d-limonene because it is 94% to 98% d-limonene. Citrus stripper oil also includes 0.37 to 1.50% aldehydes and 0.07 to 2.46% esters. Other chemical and physical properties of citrus stripper oil are given in *Florida Citrus Oils,* Bulletin 749 (technical), Agricultural Experiment Stations, Institute of Food and Agricultural Sciences, University of Florida, Gainsville, by J. W. Kesterson, R. Hendrickson, and R. J. Braddock, December 1971, pp. 154–157 Citrus stripper oil is obtained as a by-product from the manufacture of citrus molasses.

The surfactant used is a nonionic surfactant. In the preferred embodiment, the surfactant used is nonylphenol polyethylene glycol ether NP-9. The corrosion inhibitor used is 1,3-diethylthiourea.

One gallon of the preferred mixture will treat two hundred square yards of six inch deep soil. Thus about 0.85 gallons of sulfuric acid will treat two hundred square yards of six inch deep soil. It has been found that the minimum amount of sulfuric acid required to treat two hundred square yards of six inch deep soil is about 0.7 gallons. This is approximately 0.01 percent of sulfuric acid to soil by volume. The ratio of sulfuric acid to citrus stripper oil can vary considerably, but at least 97%:3% sulfuric acid to citrus stripper oil is required for the treatment of silty clay soils and slightly more than 3% citrus stripper oil to sulfuric acid is the minimum amount required for clay and sand soils. The maximum amount of citrus stripper oil with respect to sulfuric acid is limited by practical considerations, the foremost of which is expense. If too much citrus stripper oil is used, it would be wasted and add to the expense of treating the soil. Another practical limitation in the amount of citrus stripper oil with respect to sulfuric acid is encountered when the two components are premixed before dilution with water. In premixing, the minimum amount of sulfuric acid to citrus stipper oil is 70%:30%. A mixture containing less sulfuric acid and more citrus stripper oil is highly prone to generate fumes and separate. In the range of 70%:30% to 80%:20%, the mixture must be kept below 40° F. to prevent separation of the citrus stripper oil from the sulfuric acid.

The amount of water used to dilute the sulfuric acid and citrus stripper oil is determined by the optimum moisture of the soil. When treating soil, it is desirable to be 1–2% above the optimum moisture of the soil. The optimum moisture of the soil is the moisture content at which a soil becomes sufficiently workable when compacted to expel a large percentage of air and produce a maximum soil density. Thus, the optimum moisture of the soil is important to the compression and packing step. The optimum moisture of the soil is readily ascertainable by conventional methods. In reaching 1–2% above the optimum moisture of the soil which is to be treated, the amount of water already in the soil is determined using conventional methods; then the amount of water that is needed to reach 1–2% above the optimum moisture for the soil is calculated. It is this calculated amount of water that, along with the preferred mixture, is added to the soil. Thus, when the preferred mixture is diluted with water, the water already in the soil may be considered. Too much or too little water will make the soil harder if not impossible to correctly pack.

The soil in a road is typically treated as follows: The preferred mixture is added to water in truck-mounted tanks to form a diluted preferred mixture. The amount of water that is used to dilute the preferred mixture is that which has been calculated as needed to reach 1–2% above the optimum moisture of the soil. One half of the diluted preferred mixture is sprayed onto the road from the tanks. A road grader or other suitable means is used to work the diluted preferred mixture into the soil until thoroughly wetted. Then, the other one half of the diluted mixture is sprayed onto the road and worked into the soil. A packer or roller is used to pack and consolidate the soil in a conventional manner. The portion of the road that is being worked can be opened immediately for traffic. An alternative method of applying the preferred mixture to the soil can be used, particularly if the soil has a water content of roughly 1–2% above optimum moisture: the preferred mixture can be added without dilution directly to the soil.

Another way to implement the method of the present invention involves applying the sulfuric acid and citrus stripper oil mixture to dry haul-in soil. If the native soil at the job site is found to be unsatisfactory, soil can be hauled in for mixing with the native soil. Haul-in soil is typically obtained from pits remote from the road job site. As the haul-in soil is being loaded onto trucks for transport to the road job site, the preferred mixture is sprayed onto the soil. The haul-in soil must be dry (1% or less moisture content) to prevent activation of the preferred mixture with the soil. When the haul-in soil is admixed to the native soil at the road job site, the road can be sprayed with water to start the activation of the preferred mixture with the soil. The road is then packed as described above.

The soil which is to be treated must be a cohesive type of soil. Such soils contain amounts of clay and/or some types of silt. In the method of the present invention, the plasticity index of a soil is utilized to determine whether a soil is suitable for treatment. It has been found that the plasticity index of the soil to be treated should be at least 7. Soils having a high plasticity index, for example greater than 20 to 25, can be treated with the method of the present invention, but the treated soils will swell when wet. The method of the present invention does not change the liquid limit, the plastic limit, and consequently the plasticity index of the soil. Soils having a high plasticity index can be treated to make a base for a road. In the road base is paved over with seal coating or some type of sealing surface to keep out moisture and prevent swelling of the base material. Soil can be hauled in and mixed with the native on-site soil to obtain a soil with a suitable plasticity index. In addition, if the native on-site soil is composed of a large percentage of fines, coarse soil can be hauled in and mixed with the native soil to prevent the driving surface from becoming slick during wet periods. When dealing with unsuitable native soil, this soil blending technique is considerably less expensive than hauling in new soil to totally replace the native soil, as is frequently done in the prior art.

Cohesive soils treated with the method of the present invention exhibit high compressive strength. In Table 1 there are given the results of tests conducted on a soil treated with the method of the present invention.

TABLE 1

| Specimen Number | Age (days) | Optimum Moisture Content (percent) | Actual Moisture Content (percent) | Compressive Strength (psi) |
|---|---|---|---|---|
| 1 | 11 | 6.5 | 7.2 | 375* |
| 2 | 14 | 6.5 | 7.2 | 454 |
| 3 | 28 | 6.5 | 7.2 | 520 |

*Cap not perpendicular to test specimen

The soil tested was a mixture of what was probably a CH clay (as classified under the Unified Soil Classification System) and limestone. As the test specimens aged, the compressive strength increased. Thus, specimen 1 aged for eleven days and had a compressive strength of 375 psi, specimen 2 aged for fourteen days and had a compressive strength of 454 psi, and specimen 3 aged for 28 days and had a compressive strength of 520 psi. The compressive strength tests were performed on six inch diameter by eight inch high molded cylindrical specimens and were in accordance with ASTM D1633 test method for compressive strength of molded soil cement cylinders.

Table 2 gives a characterization of the soil that was tested in Table 1.

TABLE 2

| | Optimum Moisture Content (percent) | Maximum Dry Density (pounds per cubic foot) | Liquid Limit | Plastic Limit | Plasticity Index |
|---|---|---|---|---|---|
| Untreated soil | 7.2 | 135.5 | 33 | 15 | 18 |
| Treated Soil | 6.5 | 135.7 | 34 | 15 | 19 |

The test specimens were made with an amount of water that equalled the optimum moisture of the untreated soil. This left the test specimens a little too dry and thus made correct packing and consolidation difficult. It is believed that test specimens of the same soil mixed with an amount of water of about 9.2% (about 2% greater moisture content than the optimum moisture of the soil) would result in higher compressive strengths.

A sulfuric acid and citrus stripper oil mixture can probably be used to rework roads surfaced with asphalt. The preferred mixture for reworking asphalt roads has 70% concentrated sulfuric acid and 30% citrus stripper oil by volume. Compared to the preferred mixture used on soil, the preferred mixture used on asphalt roads has a proportionately larger amount of citrus stripper oil in order to soften the asphalt. One gallon of the preferred asphalt road mixture treats an asphalt road 200 square yards, 6 inches deep, of which 2 inches is asphalt and 4 inches is soil. A mixture of sulfuric acid and citrus stripper oil having more than 30% citrus stripper oil could be used to treat an asphalt road, provided at least 0.7 gallons of sulfuric acid per 200 square yards, 6 inches deep of soil is used. Likewise, a mixture of sulfuric acid and citrus stripper oil having less than 30% citrus stripper oil could be used to treat an asphalt road; however, more than more than one gallon of the mixture per 200 square yards, 6 inches deep, of which 2 inches is asphalt and 4 inches is soil, may be required to sufficiently soften the asphalt.

The procedure for reworking an asphalt road is as follows: The old asphalt road is chiseled to break up the asphalt. The chiseling is as deep as the road bed is to be. The preferred asphalt road mixture is diluted with enough water to reach 1-2% above the optimum moisture content of the soil underneath the asphalt and then one third to one half of the diluted mixture is sprayed onto the road. After an hour or so has passed, more of the diluted mixture is sprayed onto the road. Applications are repeated until the asphalt is softened enough to be worked. Then, the soil and asphalt are admixed together. Finally, the road is compacted to consolidate the soil and asphalt. The surface of the reworked road has soil and asphalt. The reworked road makes a good road base which can be repaved.

An important aspect of the present invention is that cohesive soils can be treated to obtain compressive strengths that are higher than what can be obtained by prior art methods of chemical soil stabilization. Although the mechanism of how the present invention works to provide large compressive strengths is unknown, it is believed that the method of the present invention somehow increases the cohesion between the soil particles.

Another aspect of the present invention is that sulfuric acid and citrus stripper oil are both relatively inexpensive. Thus, roads can now be treated more economically than ever before. Furthermore, sulfuric acid and citrus stripper oil are appealing because they are probably biodegradable.

Having thus described the invention, it will be understood that such description has been given by way of illustration and example and not by way of limitation, reference for the latter purpose being had to the appended claims.

What is claimed is:

1. A method of stabilizing a cohesive soil having a plasticity index of at least 7, comprising the steps of:
   a. admixing sulfuric acid, citrus stripper oil, and water in a predetermined volumetric proportion to said soil to form a treated soil, said predetermined proportion comprising at least 0.01% concentrated sulfuric acid to said soil, at least 3% citrus stripper oil to 97% concentrated sulfuric acid, and an appropriate amount of water to said soil to form a treated soil that is satisfactorily packable;
   b. packing said treated soil to consolidate said soil, wherein the compressive strength of said treated and consolidated soil is increased compared to the compressive strength of the untreated soil.

2. The method of claim 1 wherein the proportion of concentrated sulfuric acid to citrus stripper oil is within the range of 70%:30% to 97%:3% by volume.

3. The method of claim 1 wherein said sulfuric acid and and said citrus stripper oil are premixed before admixing with said soil and water, the proportion of concentrated sulfuric acid being at least 70% sulfuric acid to citrus stripper oil by volume.

4. The method of claim 1 wherein the amount of water admixed into said soil is of an appropriate amount so that the moisture content of the soil is 1 to 2% above the optimum moisture of the soil.

5. The method of claim 2 wherein the amount of water admixed into said soil is of an appropriate amount so that the moisture content of the soil is 1 to 2% above the optimum moisture of the soil.

6. The method of claim 3 wherein the amount of water admixed into said soil is of an appropriate amount so that the moisture content of the soil is 1 to 2% above the optimum moisture of the soil.

7. The method of claim 1 wherein a surfactant is admixed to said soil together with said sulfuric acid, said citrus stripper oil, and said water.

8. The method of claim 7 wherein said surfactant comprises a nonionic surfactant.

9. The method of claim 3 wherein a corrosion inhibitor is admixed to said premixture of sulfuric acid and citrus stripper oil.

10. The method of claim 9 wherein a surfactant is admixed to said premixture of sulfuric acid and citrus stripper oil.

11. The method of claim 1 comprising the step of admixing different soils to form a treatable cohesive soil having a plasticity index within the range of 7 to 25.

12. A composition of stabilized soil comprising a packed and consolidated admixture of cohesive soil, sulfuric acid, and citrus stripper oil, the proportion of sulfuric acid to soil being at least 0.01% concentrated sulfuric acid to soil by volume, and the proportion of citrus stripper oil to sulfuric acid being at least 3% citrus stripper oil to 97% concentrated sulfuric acid by volume.

13. The composition of claim 12 wherein the proportion of concentrated sulfuric acid to citrus stripper oil is within the range of 70%:30% to 97%:3% by volume.

* * * * *